(12) United States Patent
Goto et al.

(10) Patent No.: US 11,433,727 B2
(45) Date of Patent: Sep. 6, 2022

(54) ELECTRIC SUSPENSION DEVICE

(71) Applicant: HONDA MOTOR CO., LTD., Tokyo (JP)

(72) Inventors: Yuya Goto, Wako (JP); Ryoma Kanda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/199,799

(22) Filed: Mar. 12, 2021

(65) Prior Publication Data

US 2021/0291609 A1 Sep. 23, 2021

(30) Foreign Application Priority Data

Mar. 17, 2020 (JP) .............................. JP2020-047007

(51) Int. Cl.
| | |
|---|---|
| *B60G 17/018* | (2006.01) |
| *B60G 23/00* | (2006.01) |
| *B62C 3/00* | (2006.01) |
| *B62K 25/00* | (2006.01) |
| *G06F 7/00* | (2006.01) |
| *G06F 17/00* | (2019.01) |
| *G06F 19/00* | (2018.01) |
| *B60G 17/015* | (2006.01) |

(52) U.S. Cl.
CPC .... *B60G 17/0157* (2013.01); *B60G 2202/422* (2013.01); *B60G 2400/102* (2013.01); *B60G 2400/206* (2013.01); *B60G 2500/10* (2013.01)

(58) Field of Classification Search
CPC .......... B60G 17/0157; B60G 2202/422; B60G 2400/102; B60G 2400/206; B60G 2500/10

USPC ........................................................... 701/37
See application file for complete search history.

(56) References Cited

U.S. PATENT DOCUMENTS

| | | | | |
|---|---|---|---|---|
| 5,445,405 | A * | 8/1995 | Onozawa ............. | B60G 17/019 280/5.506 |
| 5,671,142 | A * | 9/1997 | Tatarazako ............. | B60G 17/06 701/37 |
| 2010/0032912 | A1* | 2/2010 | Inoue .................... | F16F 15/002 280/5.502 |
| 2013/0060422 | A1* | 3/2013 | Ogawa ................... | B60G 17/08 701/37 |

(Continued)

FOREIGN PATENT DOCUMENTS

JP 2015-047906 A 3/2015

*Primary Examiner* — Mahmoud S Ismail
(74) *Attorney, Agent, or Firm* — Rankin, Hill & Clark LLP

(57) ABSTRACT

Provided is an electric suspension device including an electromagnetic actuator that is provided between a body and wheel of a vehicle and generates damping force for damping vibration of the body. It includes: an information acquisition unit that acquires information on a sprung speed and sprung acceleration of the vehicle; a bounce target value computation unit that computes a bounce target value for controlling the vehicle's bounce orientation based on the sprung speed; and a driving control unit that controls driving of the actuator with a control target load which is based on the bounce target value. The bounce target value computation unit has a bounce target load map in which the bounce target value is associated with the sprung speed. The bounce target value computation unit adjusts a width of a dead zone set in the map based on the information on the sprung speed and sprung acceleration.

2 Claims, 10 Drawing Sheets

(56) References Cited

U.S. PATENT DOCUMENTS

2015/0066295 A1\* 3/2015 Kanda .............. B60G 17/01933
701/38
2021/0354523 A1\* 11/2021 Hirao ...................... F16F 15/02

\* cited by examiner

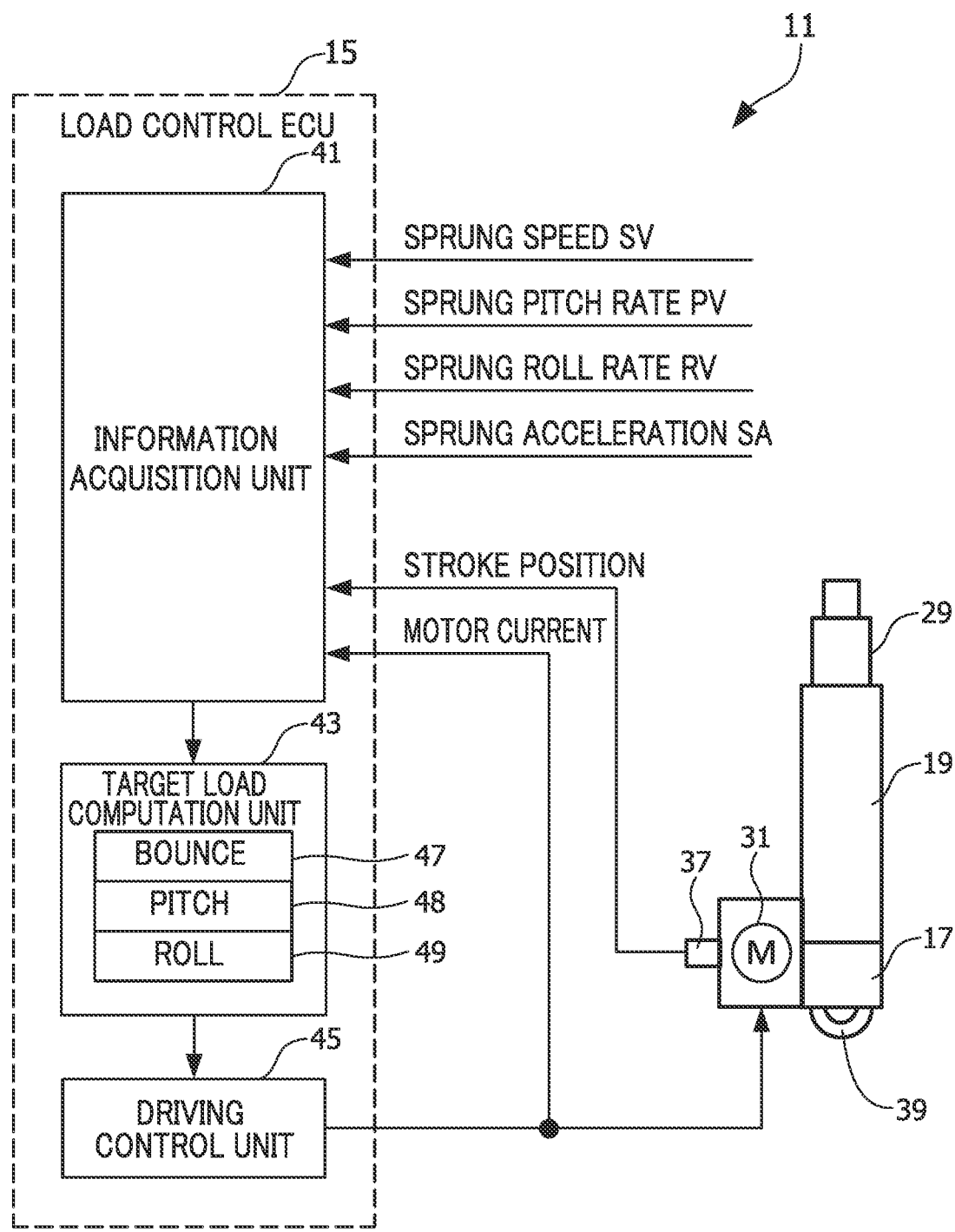

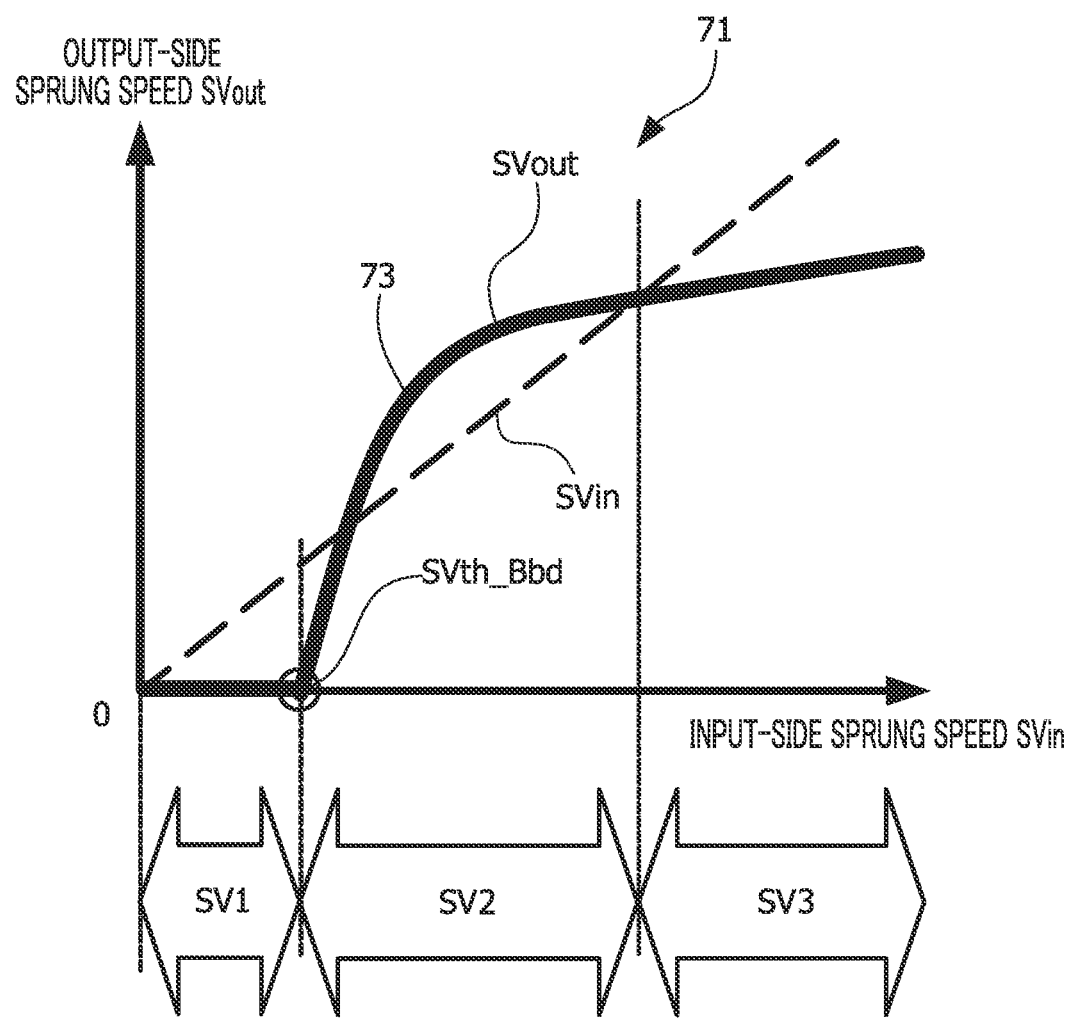

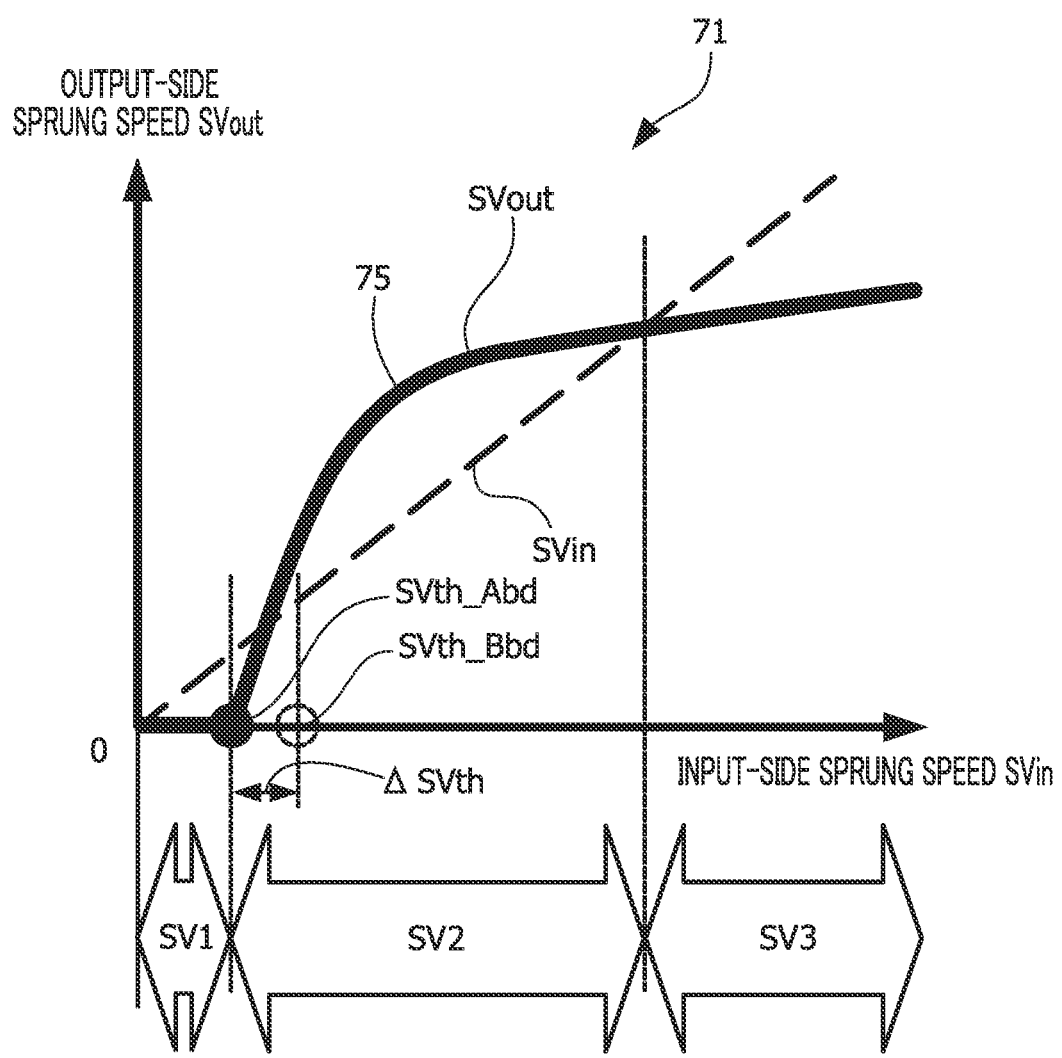

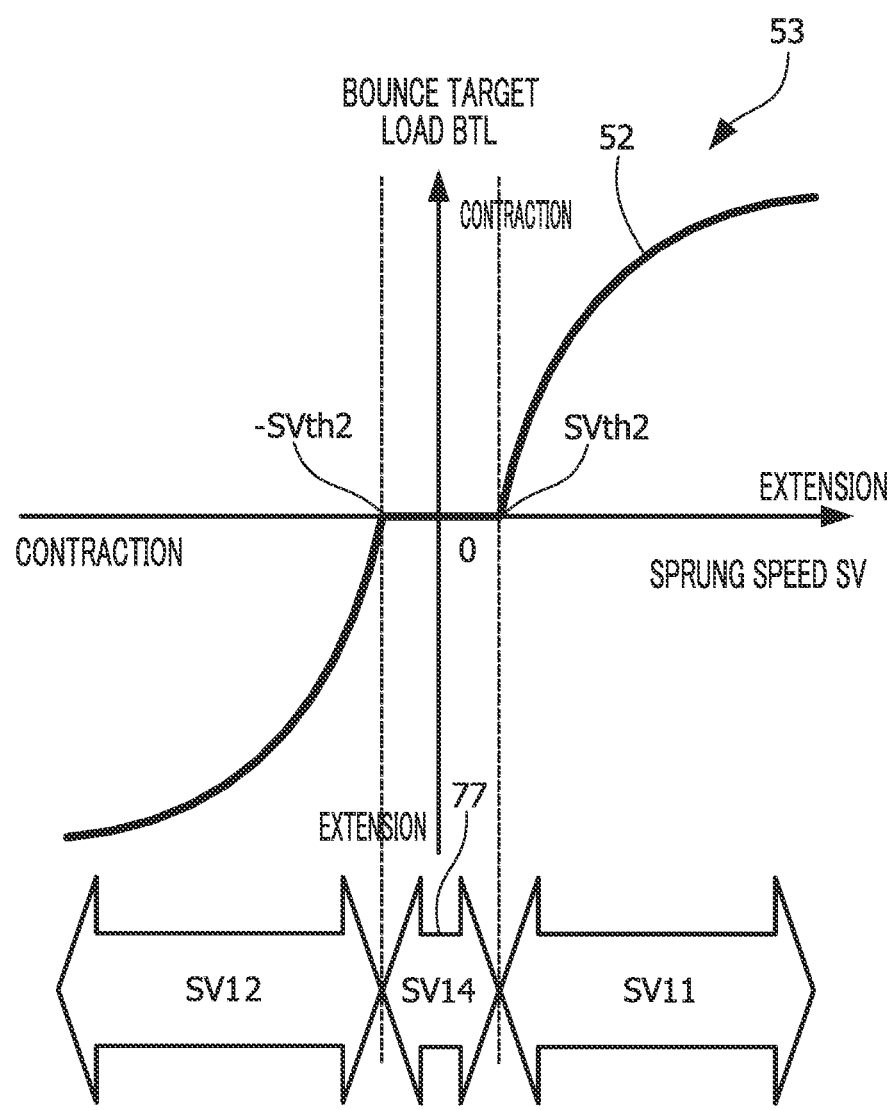

ELECTRIC SUSPENSION DEVICE

This application claims the benefit of foreign priority to Japanese Patent Application No. JP 2020-047007, filed Mar. 17, 2020, which is incorporated by reference in its entirety.

BACKGROUND OF THE INVENTION

1. Field of the Invention

The present invention relates an electric suspension device including an actuator that is provided between a body and a wheel of a vehicle and generates damping force for damping vibration of the body.

2. Description of the Related Art

An electric suspension device has heretofore been known which includes an actuator that is provided between a body and a wheel of a vehicle and generates damping force for damping vibration of the body (see Patent Literature 1).

The electric suspension device disclosed in Patent Literature 1 includes: a basic input amount calculation unit that calculates a basic input amount of the vehicle based on an amount of change in wheel speed detected by a wheel speed sensor; a target current setting unit that sets a target current based on the basic input amount; a target current setting unit that sets a target current based on an acceleration of the body of the vehicle detected by an acceleration sensor; and a control unit that controls a damper (actuator) based on the target current when a vehicle behavior control device that controls behavior of the vehicle is not operating, and controls the damper based on the target current when the vehicle behavior control device is operating.

The electric suspension device disclosed in Patent Literature 1 can appropriately control the damping force of the actuator regardless of the caster angle at which the suspension is set and without using vertical G sensors or stroke sensors.

Patent Literature 1: JP 2015-047906 A

SUMMARY OF THE INVENTION

Meanwhile, in the electric suspension device disclosed in Patent Literature 1, a damping force base value calculation unit calculates a damping force base value (in consideration of correction at a subsequent stage) by referring to a sprung speed-damping force map based on a sprung speed inputted to the damping force base value calculation unit, as illustrated and described in FIG. 12 and paragraph 0080 of Patent Literature 1. In the sprung speed-damping force map referred to here, a dead zone in which the damping force base value is zero is set in a sprung speed including a switch point at which the direction of the sprung speed switches from the extension side to the contraction side or from the contraction side to the extension side.

In the electric suspension device disclosed in Patent Literature 1, due to reasons such as that the values of the sprung speed in the speed range including the switch point tend to contain errors, the dead zone is set in the speed rage including the switch point and a fixed value (zero) is associated as the damping force base value with the values of the sprung speed in this dead zone. In this way, even when values of the sprung speed contain errors, erroneous damping force control attributable to these errors is avoided as much as possible.

However, in the case of the electric suspension device disclosed in Patent Literature 1, which performs a computation involving setting the dead zone in the speed range in which the sprung speed is at or around the switch point, and associating a fixed value (zero) as the damping force base value with the values of the sprung speed in this speed range, and controls the driving of the actuator by using the damping force base value obtained as the result of this computation, even if the values of the sprung speed in the dead zone is accurate values, these accurate values are not reflected on the actuator driving control.

Thus, the electric suspension device disclosed in Patent Literature 1 still has room for improvement in appropriately suppressing changes in behavior of the vehicle.

The present invention has been made in view of the above circumstance and an object thereof is to provide an electric suspension device capable of appropriately suppressing changes in behavior of a vehicle even when a dead zone is set in a speed range including a switch point for the sprung speed.

In order to achieve to the above object, an electric suspension device according to the present invention (1) is an electric suspension device including an actuator that is provided between a body and a wheel of a vehicle and generates damping force for damping vibration of the body. The main feature of the electric suspension device is that it includes: an information acquisition unit that acquires information on each of a sprung speed and a sprung acceleration of the vehicle; a bounce target value computation unit that computes a bounce target value for controlling a bounce orientation of the vehicle based on the sprung speed; and a driving control unit that controls driving of the actuator by using a control target load which is based on the bounce target value, the bounce target value computation unit has a function in which the bounce target value is associated with the sprung speed, in the function, a dead zone is set in which a fixed value is associated as the bounce target value with changes in the sprung speed belonging to a predetermined speed range including a switch point at which a direction of the sprung speed switches from an extension side to a contraction side or from the contraction side to the extension side, and the bounce target value computation unit adjusts a width of the dead zone based on the information on the sprung speed and the sprung acceleration.

According to the electric suspension device according to the present invention (1), it is possible to appropriately suppress changes in behavior of a vehicle even when a dead zone is set in a speed range including a switch point for the sprung speed.

BRIEF DESCRIPTION OF THE DRAWINGS

FIG. 3 is a diagram of configurations inside and around a load control ECU included in the electric suspension device according to an embodiment of the present invention.

FIG. 4B is an explanatory diagram of a sprung speed conversion map to be used in adjustment of the width of a dead zone set in a function in which bounce target values are associated with values of a sprung speed.

FIG. 4C is an explanatory diagram of a sprung speed conversion map to be used in the adjustment of the width of the dead zone set in the function in which bounce target values are associated with values of the sprung speed.

FIG. 4F is an explanatory diagram of a bounce target load map conceptually indicating a relation between the sprung speed and the bounce target load varying according to the sprung speed.

DETAILED DESCRIPTION OF THE EMBODIMENTS

Figure 1:
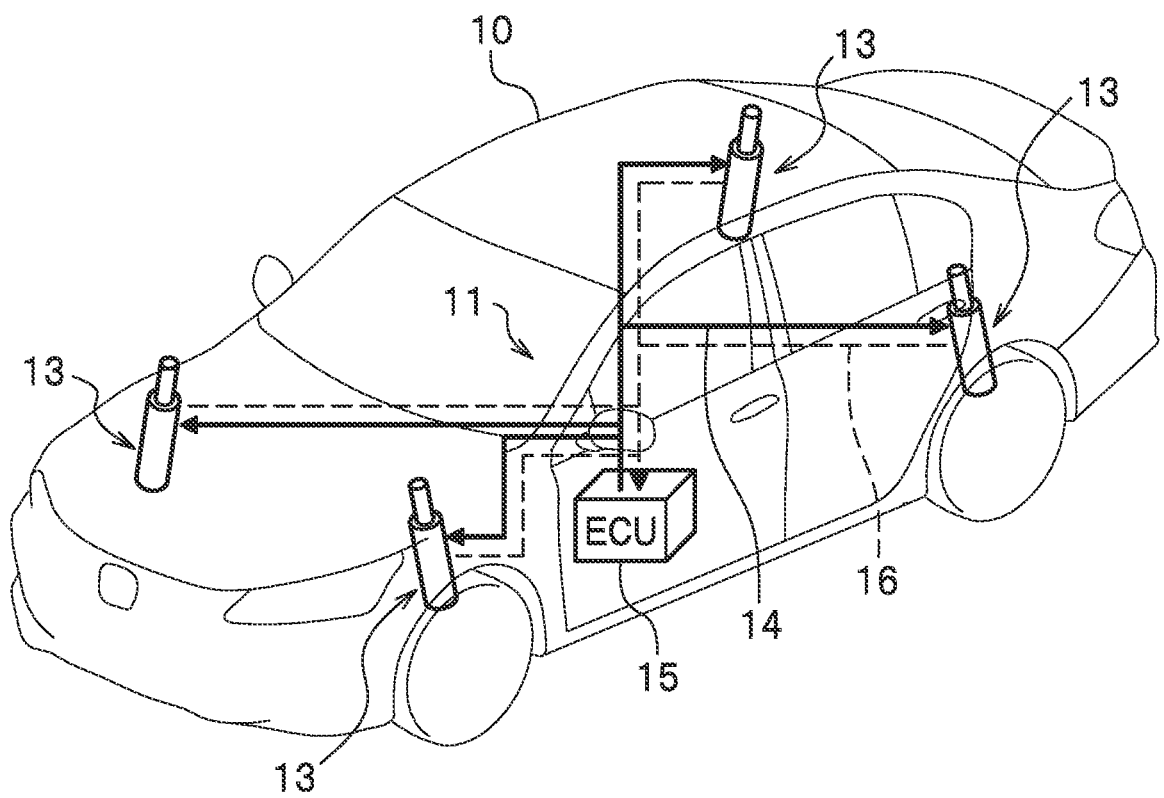
FIG. 1 is a diagram of an entire configuration of electric suspension devices according to embodiments of the present invention.

Electric suspension devices 11 according to embodiments of the present invention will be described in detail below with reference the drawings as appropriate.

Note that, in the drawings be presented below, members having the same function are denoted by the same reference sign. In this case, as a general rule, a redundant description will be omitted. Moreover, the sizes and shapes of the members may be changed or exaggerated and schematically illustrated for convenience of explanation.

[Basic Configuration Common to Electric suspension devices 11 According to Embodiments of The Present Invention]

Firstly, a basic configuration common to the electric suspension devices 11 according to the embodiments of the present invention will be described with reference to FIGS. 1 and 2.

FIG. 1 is a diagram of an entire configuration common to the electric suspension devices 11 according to the embodiments of the present invention. FIG. 2 is a partially cross-sectional view of an electromagnetic actuator 13 forming a part of the electric suspension devices 11.

As illustrated in FIG. 1, the electric suspension device 11 according to embodiments of the present invention includes a plurality of electromagnetic actuators 13 each provided for a wheel of a vehicle 10, and a load control ECU 15. The plurality of electromagnetic actuators 13 and the load control ECU 15 are connected to each other by respective power supply lines 14 (see the solid lines in FIG. 1) for supplying driving control power from the load control ECU 15 to the plurality of electromagnetic actuators 13 and respective signal lines 16 (see the broken lines in FIG. 1) for sending driving control signals for electric motors 31 (see FIG. 2) from the plurality of electromagnetic actuators 13 to the load control ECU 15.

In the present embodiments, a total of four electromagnetic actuators 13 are disposed, each for one of the front wheels (front left wheel and front right wheel) and the rear wheels (rear left wheel and rear right wheel). The driving of the electromagnetic actuators 13 provided for the respective wheels is controlled independently of each other for extension-contraction operations at the wheels.

In the embodiments of the present invention, the plurality of electromagnetic actuators 13 have a common configuration unless otherwise noted. Thus, the configuration of one electromagnetic actuator 13 will be described as a description of the plurality of electromagnetic actuators 13.

Figure 2:
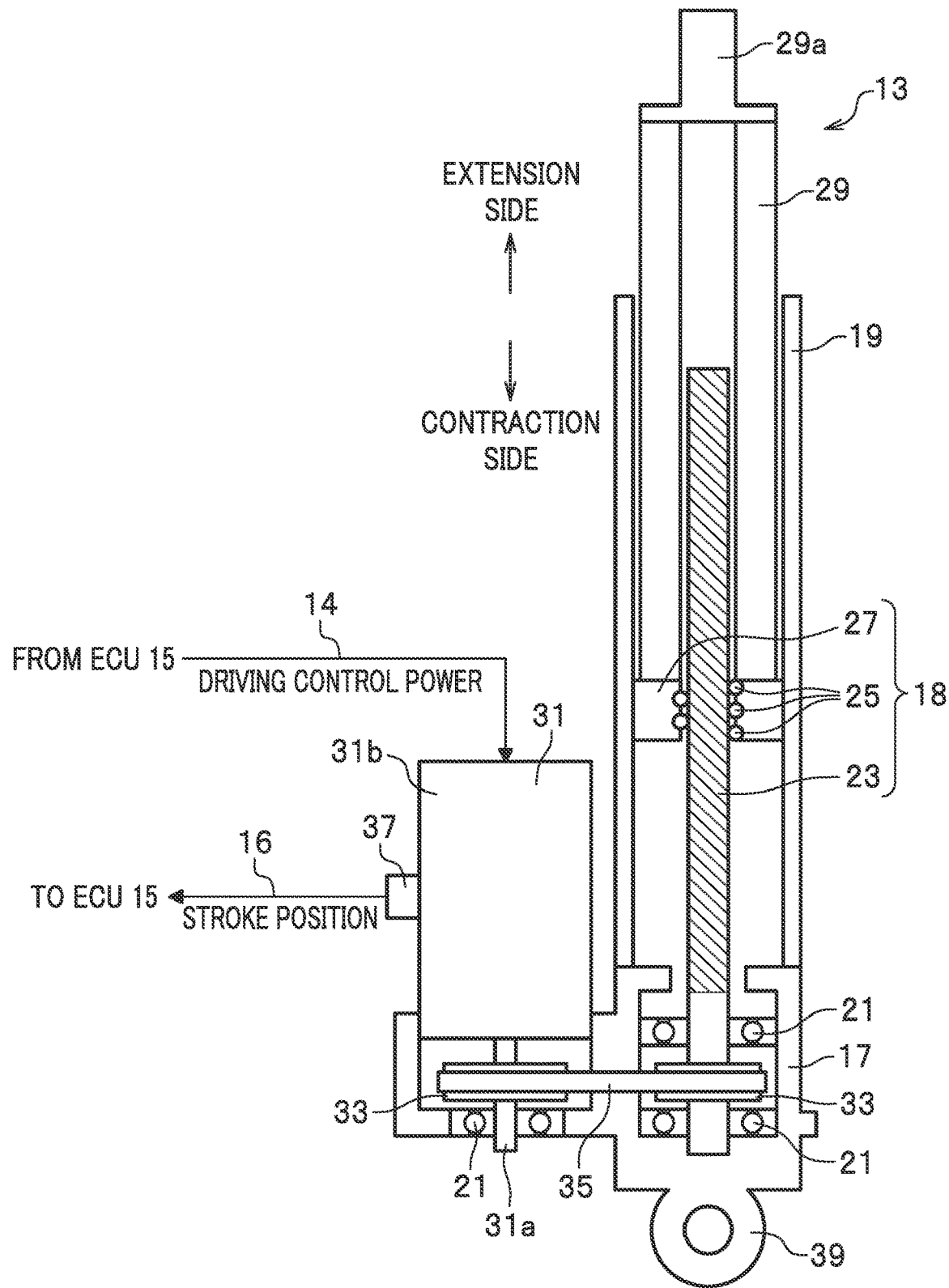
FIG. 2 is a partially cross-sectional view of an electromagnetic actuator included in the electric suspension devices according to the embodiments of the present invention.

As illustrated in FIG. 2, the electromagnetic actuator 13 includes a base housing 17, an outer tube 19, a ball bearing 21, a ball screw shaft 23, a plurality of balls 25, a nut 27, and an inner tube 29.

The base housing 17 supports the proximal end side of the ball screw shaft 23 via the ball bearing 21 such that the ball screw shaft 23 is rotatable about its axis. The outer tube 19 is provided on the base housing 17 and accommodates a ball screw mechanism 18 including the ball screw shaft 23, the plurality of balls 25, and the nut 27. The plurality of balls 25 roll along a screw groove on the ball screw shaft 23. The nut 27 is engaged with the ball screw shaft 23 via the plurality of balls 25 and converts a rotational motion of the ball screw shaft 23 into a linear motion. The inner tube 29, which is coupled to the nut 27, moves in the axial direction of the outer tube 19 together with the nut 27.

In order to transmit rotational driving force to the ball screw shaft 23, the electromagnetic actuator 13 includes an electric motor 31, a pair of pulleys 33, and a belt member 35, as illustrated in FIG. 2. The electric motor 31 is provided on the base housing 17 in parallel to the outer tube 19. The pulleys 33 are mounted on a motor shaft 31a of the electric motor 31 and the ball screw shaft 23, respectively. Around these pair of pulleys 33 is stretched the belt member 35 for transmitting the rotational driving force of the electric motor 31 to the ball screw shaft 23.

The electric motor 31 is provided with a resolver 37 that detects a rotational angle signal from the electric motor 31. The rotational angle signal from the electric motor 31 detected by the resolver 37 is sent to the load control ECU 15 via the signal line 16. The rotational driving of the electric motor 31 is controlled according to the driving control power supplied from the load control ECU 15 to each of the plurality of the electromagnetic actuators 13 via the corresponding power supply line 14.

Note that the present embodiments employ the layout in which the motor shaft 31a of the electric motor 31 and the ball screw shaft 23 are disposed substantially parallel to each other and coupled to each other, as illustrated in FIG. 2, to shorten the axial dimension of the electromagnetic actuator 13. Alternatively, a layout may be employed in which the motor shaft 31a of the electric motor 31 and the ball screw shaft 23 are disposed coaxially with each other and coupled to each other.

As illustrated in FIG. 2, the electromagnetic actuators 13 according to the embodiments of the present invention are provided with a coupling portion 39 at a lower end portion of the base housing 17. This coupling portion 39 is coupled and fixed to an unsprung member not illustrated (such as the lower armor the knuckle on the wheel side). On the other hand, an upper end portion 29a of the inner tube 29 is coupled and fixed to a sprung member not illustrated (such as a strut tower portion on the body side).

In short, the electromagnetic actuator 13 is provided in parallel to a spring member not illustrated provided between the body and the wheel of the vehicle 10.

The electromagnetic actuator 13 configured as above operates as below. Specifically, consider a case where, for example, a thrust related to upward vibration is inputted into the coupling portion 39 from the wheel side of the vehicle 10. In this case, the inner tube 29 and the nut 27 try to descend together relative to the outer tube 19 receiving the thrust related to the upward vibration. In response to this, the ball screw shaft 23 tries to rotate in the direction corresponding to the descent of the nut 27. At this moment, the electric motor 31 is caused to generate a rotational driving force in the direction in which the rotational driving force impede the descent of the nut 27. This rotational driving force of the electric motor 31 is transmitted to the ball screw shaft 23 via the belt member 35.

By exerting a reaction force (damping force) on the ball screw shaft 23 against the thrust related to the upward vibration in this manner, the vibration trying to be transmitted from the wheel side to the body side is damped.

[Internal Configuration of Load Control ECU 15]

Next, configurations inside and around the load control ECU 15 included in the electric suspension device 11 according to an embodiment of the present invention will be described with reference to FIG. 3.

FIG. 3 is a diagram of the configurations inside and around the load control ECU 15 included in the electric suspension device 11 according to the embodiment of the present invention.

[Electric suspension device 11 According to Embodiment of The Present Invention]

The load control ECU 15 included in the electric suspension device 11 according to the embodiment of the present invention includes a microcomputer that performs various arithmetic processes. The load control ECU 15 has a driving control function of controlling the driving of each of the plurality of electromagnetic actuators 13 based on the rotational angle signal from the electric motor 31 detected by the resolver 37, target loads, and so on to thereby generate a driving force for a damping operation and an extension-contraction operation of the electromagnetic actuator 13.

In order to implement this driving control function, the load control ECU 15 includes an information acquisition unit 41, a target load computation unit 43, and a driving control unit 45, as illustrated in FIG. 3.

As illustrated in FIG. 3, the information acquisition unit 41 acquires the rotational angle signal from the electric motor 31 detected by the resolver 37 as time-series information on the stroke position and also acquires information on a sprung speed SV by time-differentiating the time-series information on the stroke position. Note that the sprung speed SV is the speed of the sprung mass (body) in the vertical direction.

As illustrated in FIG. 3, the information acquisition unit 41 also acquires time-series information on each of a sprung pitch rate PV, a sprung roll rate RV, and a sprung acceleration SA.

The information on the sprung pitch rate PV and the sprung roll rate RV may be acquired by, for example, a gyro sensor (not illustrated) provided in the vehicle 10.

The information on the sprung acceleration SA may be acquired by time-differentiating the information on the sprung speed SV.

Also, based on the obtained information on the sprung speed SV, the information acquisition unit 41 acquires information indicating toward which one of the extension side and the contraction side the direction of the sprung speed SV is oriented. Similarly, based on the obtained information on the sprung acceleration SA, the information acquisition unit 41 acquires information indicating toward which one of the extension side and the contraction side the direction of the sprung acceleration SA is oriented.

Further, the information acquisition unit 41 acquires information on a sprung speed absolute value | SV | by converting the obtained information on the sprung speed SV into an absolute value.

As illustrated in FIG. 3, the information acquisition unit 41 further acquires time-series information on each of a vehicle speed VS, the stroke position of the electromagnetic actuator 13, and a motor current for the electric motor 31.

The pieces of information on the sprung speed SV, the sprung pitch rate PV, the sprung roll rate RV, the sprung acceleration SA, the direction of the sprung speed SV, the direction of the sprung acceleration SA, the sprung speed absolute value |SV|, the vehicle speed VS, the stroke position of the electromagnetic actuator 13, and the motor current for the electric motor 31 acquired by the information acquisition unit 41 are sent to the target load computation unit 43.

As illustrated in FIG. 3, the target load computation unit 43 has a function of figuring out the target loads, which are target values for a damping operation and an extension-contraction operation of the electromagnetic actuator 13, by computation based on the various pieces of information acquired by the information acquisition unit 41. Specifically, the target load computation unit 43 includes a bounce target value computation unit 47, a pitch target value computation unit 48, and a roll target value computation unit 49, as illustrated in FIG. 3.

The bounce target value computation unit 47 computes a bounce target value for controlling the bounce orientation of the vehicle 10 based on information such as the sprung speed SV and the sprung acceleration SA. The pitch target value computation unit 48 computes a pitch target value for controlling the pitch orientation of the vehicle 10 based on the sprung pitch rate PV. The roll target value computation unit 49 computes a roll target value for controlling the roll orientation of the vehicle 10 based on the sprung roll rate RV.

Internal configuration of the bounce target value computation unit 47 included in the target load computation unit 43 will be specifically described later.

The driving control unit 45 calculates a target current value that can achieve the target loads figured out by the target load computation unit 43. The driving control unit 45 then controls the driving of the electric motor 31 included in each of the plurality of electromagnetic actuators 13 such that the motor current for the electric motor 31 follows the target current value calculated. The driving of the electric motors 31 of the plurality of electromagnetic actuators 13 is controlled independently of each other.

Note that the driving control unit 45 can preferably use, for example, an inverter control circuit when generating the driving control power to be supplied to each electric motor 31.

[Configuration of Main Part of Load Control ECU 15 Included in Electric suspension device 11]

Next, a configuration of a main part of a load control ECU 15 included in the electric suspension device 11 according to an embodiment of the present invention will be described with reference to FIGS. 4A to 4F as appropriate.

Figure 4A:
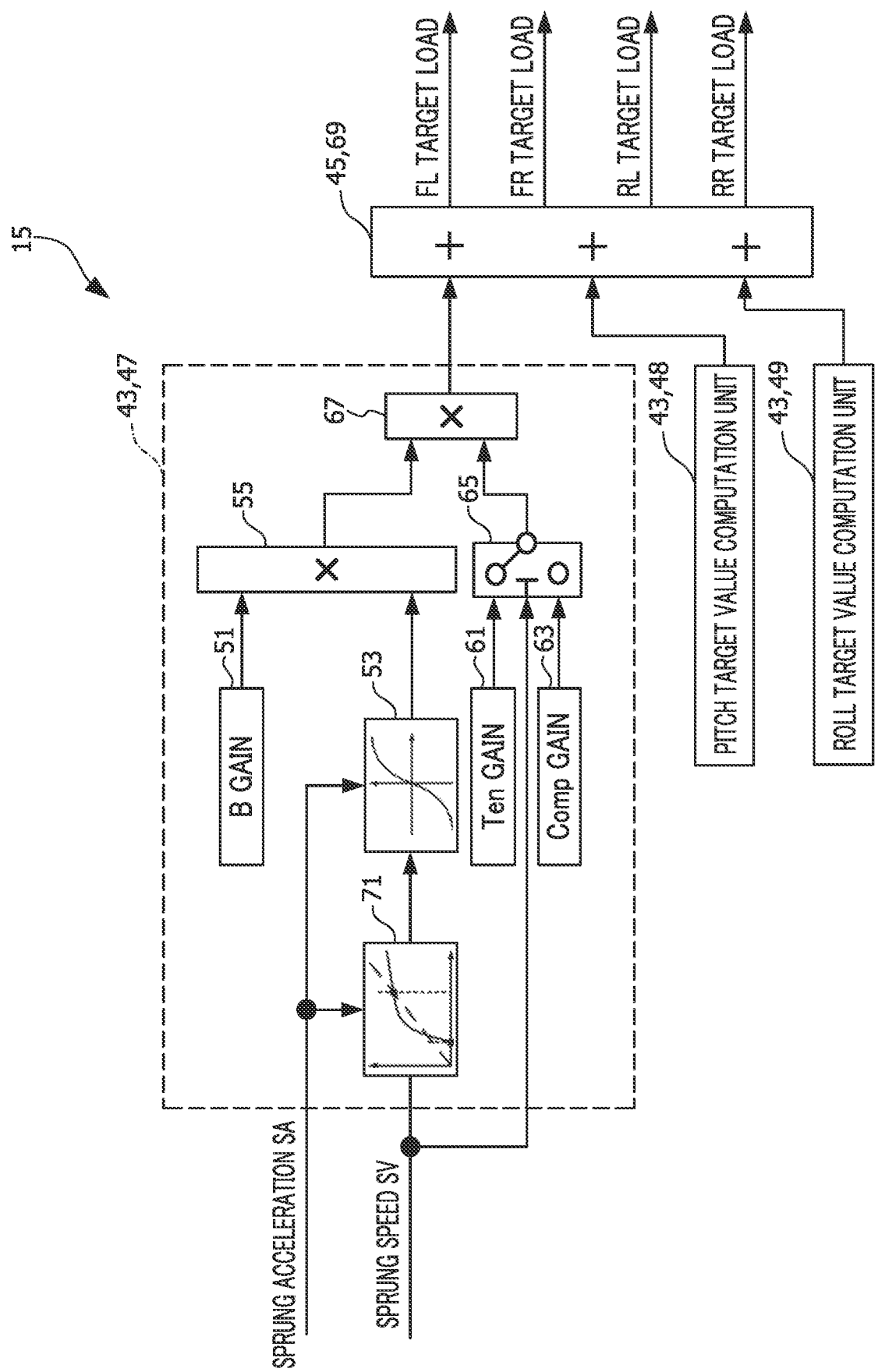
FIG. 4A is a diagram conceptually indicating an internal configuration of the load control ECU included in the electric suspension device according to an embodiment of the present invention.

FIG. 4A is a diagram conceptually illustrating the configuration of the main part of the load control ECU 15 included in the electric suspension device 11 according to the embodiment of the present invention. FIGS. 4B and 4C are explanatory diagrams of sprung speed conversion maps 73 and 75 to be used in adjustment of the width of a dead zone 77 (see FIGS. 4E and 4F) set in a function in which bounce target values are associated with absolute values

Figure 4D:
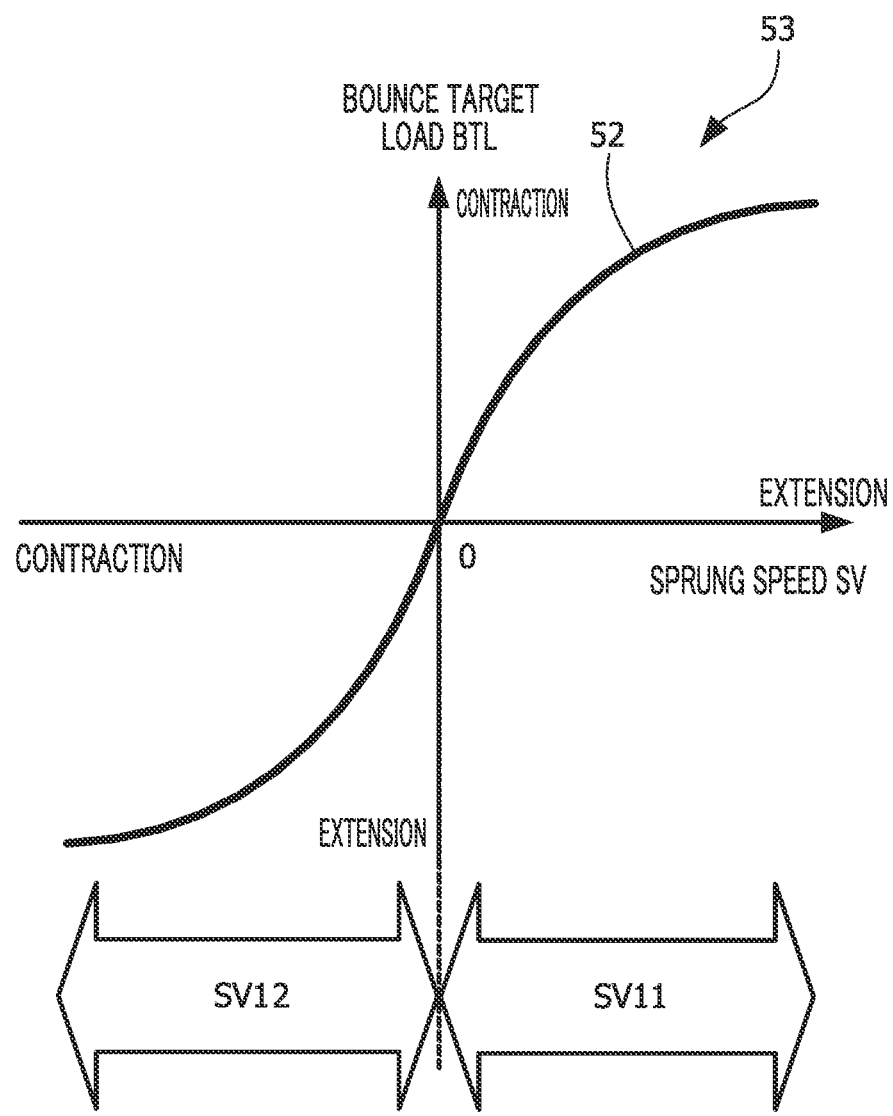
FIG. 4D is an explanatory diagram of abase bounce target load map conceptually indicating a relation between the sprung speed and a bounce target load varying according to the sprung speed.
Figure 4E:
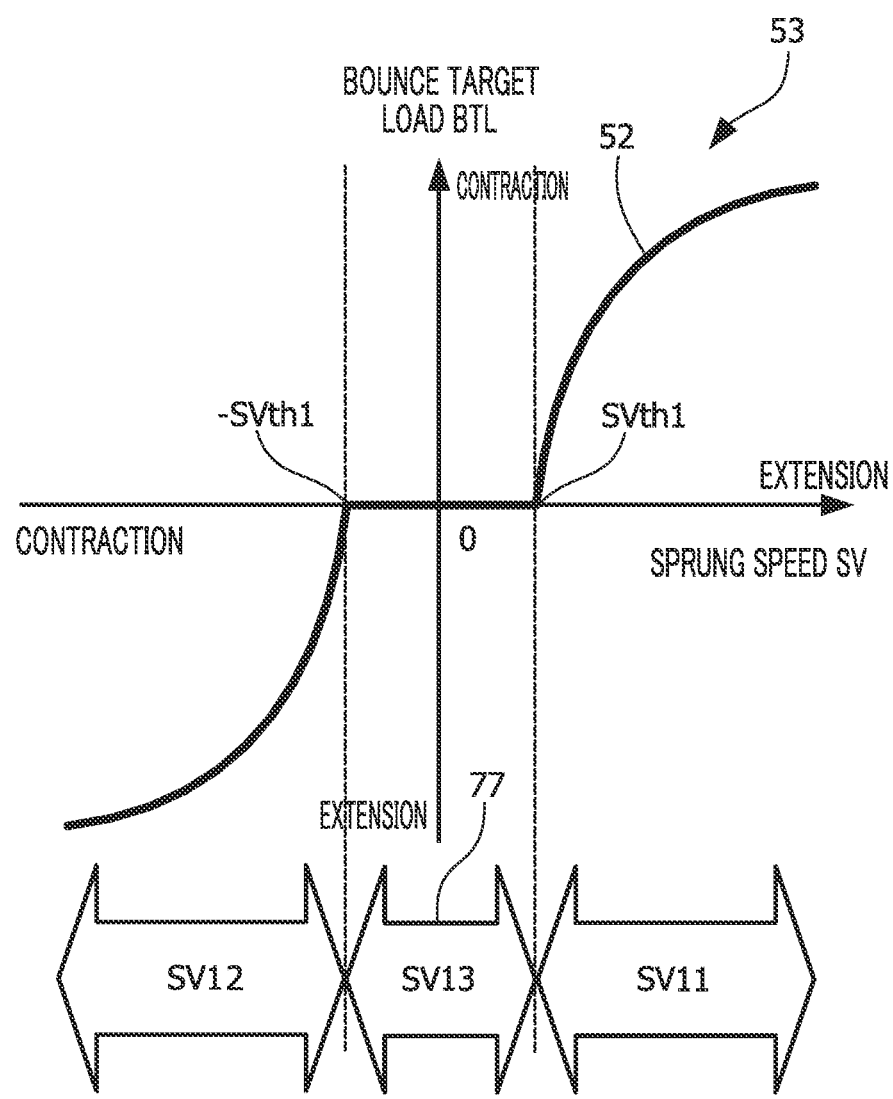
FIG. 4E is an explanatory diagram of a bounce target load map conceptually indicating a relation between the sprung speed and the bounce target load varying according to the sprung speed.

|SV| of the sprung speed SV. FIGS. 4D to 4F are explanatory diagrams of a bounce target load map 52 each conceptually indicating a relation between the sprung speed SV and a bounce target load varying according to the sprung speed SV.

The load control ECU 15 included in the electric suspension device 11 includes the bounce target value computation unit 47, the pitch target value computation unit 48, the roll target value computation unit 49, and an addition unit 69. Note that the involvement of the pitch target value computation unit 48 and the roll target value computation unit 49 in the present invention is low, and therefore detailed description thereof is omitted.

[Internal Configuration of Bounce Target Value Computation Unit 47]

The bounce target value computation unit 47 includes a bounce gain setting unit (B gain setting unit) 51, a sprung speed conversion unit 71, a bounce target load calculation unit 53, a primary multiplication unit 55, an extension-side gain (Ten gain) setting unit 61, a contraction-side gain (Comp gain) setting unit 63, a selection unit 65, and a secondary multiplication unit 67 for the purpose of obtaining a bounce target value that can maintain the bounce orientation appropriately.

A predetermined bounce gain (B gain) is set in the B gain setting unit 51. The B gain set in the B gain setting unit 51 is sent to the primary multiplication unit 55.

The sprung speed conversion unit 71 has a function of converting an input-side sprung speed absolute value |SV| in having a linear characteristic into an output-side sprung speed absolute value |SV| out having a non-linear characteristic.

When converting the sprung speed SV, the sprung speed conversion unit 71 refers to the information on the sprung speed SV and the information on the sprung acceleration SA acquired by the information acquisition unit 41, and the sprung speed conversion maps 73 (see FIG. 4B) and 75 (see FIG. 4C) as appropriate.

The sprung speed conversion maps 73 and 75 are tables to be used in the adjustment of the width of the dead zone 77 set in the function in which bounce target values are associated with values of the sprung speed SV (bounce target load map 52).

Note that in the following description, "sprung speed absolute value |SV|" is abbreviated also as "sprung speed SV" when it is not particularly necessary to distinguish whether the sprung speed SV is an absolute value or not.

The sprung speed conversion unit 71 converts the input-side sprung speed SVin having a linear characteristic into the output-side sprung speed SVout having a non-linear characteristic by selectively using a suitable one of the sprung speed conversion maps 73 and 75 based on the information on the sprung speed SV and the information on the sprung acceleration SA acquired by the information acquisition unit 41.

A specific procedure for the conversion of the sprung speed SV will be described later in detail.

The information on the sprung speed SV contains information of the sprung speed SV, the direction of the sprung speed SV, and the sprung speed absolute value |SV|.

The information on the sprung acceleration SA contains information of the sprung acceleration SA, the direction of the sprung acceleration SA, and a sprung acceleration absolute value |SA|.

The value of the output-side sprung speed SVout obtained by the conversion by the sprung speed conversion unit 71 is sent to the bounce target load calculation unit 53.

Now, a base sprung speed conversion characteristic in the base sprung speed conversion map 73 will be described with reference to FIG. 4B. Note that a base sprung speed means an output-side sprung speed SVout that serves as a base (for setting the width of the dead zone 77 at a designated value).

The range of change in the input-side sprung speed SVin in the base sprung speed conversion map 73 includes a first speed range SV1, a second speed range SV2, and a third speed range SV3, as indicated by the divided horizontal axis in FIG. 4B.

The first speed range SV1 is a speed range in which the sprung speed SV is a base boundary speed threshold value SVth_Bbd or less (|SV−SVth_Bbd|≤0). The base boundary speed threshold value SVth_Bbd is a threshold value for designating base boundary points of the dead zone 77 in the entire speed range of the sprung speed SV. The base boundary points of the dead zone 77 are set as appropriate by taking into consideration a width of the dead zone 77 that serves as a base (a designated width of the dead zone 77).

The first speed range SV1 is set to suppress a "jiggling feeling" due to damping force control performed to control damping force for vehicle body vibration.

Note that "jiggling feeling" is a sensuous expression of an impression which the driver gets when feeling a vehicle body vibration in an intermediate frequency range between a sprung resonance frequency range and an unsprung resonance frequency range.

In the first speed range SV1 illustrated in FIG. 4B, the base sprung speed conversion map 73 has such a characteristic that the output-side sprung speed SVout takes a fixed value (zero) regardless of the change in the input-side sprung speed SVin. That is, when the input-side sprung speed SVin is in the first speed range SV1 (−SVth_Bbd<SV<SVth_Bbd), the corresponding output-side sprung speed SVout is zero.

The second and third speed ranges SV2 and SV3 illustrated in FIG. 4B are speed ranges in which the input-side sprung speed SVin is greater than the base boundary speed threshold value SVth_Bbd (|SV−SVth_Bbd|>0).

In the second speed range SV2, the base sprung speed conversion map 73 has such a characteristic that the output-side sprung speed SVout takes values greater than the input-side sprung speed SVin (SVin<SVout) except for the transition period in which the input-side sprung speed SVin exceeds the base boundary speed threshold value SVth_Bbd and reaches the output-side sprung speed SVout.

The second speed range SV2 is set to suppress a "floating feeling" due to damping force control performed to control damping force for vehicle body vibration.

Note that "floating feeling" is a sensuous expression of an impression which the driver gets when feeling a vehicle body vibration in the sprung resonance frequency range.

On the other hand, in the third speed range SV3, the base sprung speed conversion map 73 has such a characteristic that the input-side sprung speed SVin takes values greater than or equal to the output-side sprung speed SVout (SVin≥SVout).

The third speed range SV3 is set to suppress a "jerking feeling" due to damping force control for a vehicle body vibration exceeding the sprung resonance frequency in which the sprung speed SV is relatively high.

Note that the "jerking feeling" is a sensuous expression of an impression which the driver gets when feeling a vehicle body vibration during execution of the damping force control.

Note that an appropriate value may be set as the base boundary speed threshold value SVth_Bbd by referring to an evaluation result acquired by evaluating a probability density function of the sprung speed SV through tests, simulations, etc. and ensuring, for example, that the distribution ratio of sprung speeds SV appearing in the first speed speed SV1, the second speed range SV2, and the third speed range SV3 satisfies a predetermined distribution ratio.

An adjustment sprung speed conversion characteristic in the adjustment sprung speed conversion map 75 will now be described with reference to FIG. 4C. Note that an adjustment sprung speed means an output-side sprung speed SVout to be used in adjustment of the width of the dead zone 77.

The range of change in the input-side sprung speed SVin in the adjustment sprung speed conversion map 75 includes a first speed range SV1, a second speed range SV2, and a third speed range SV3, as indicated by the divided horizontal axis in FIG. 4C.

The first speed range SV1 is a speed range in which the sprung speed SV is an adjustment boundary speed threshold value SVth_Abd or less ($|SV-SVth\_Abd| \le 0$). The adjustment boundary speed threshold value SVth_Abd is a threshold value for designating adjustment boundary points of the dead zone 77 in the entire speed range of the sprung speed SV. The adjustment boundary points of the dead zone 77 are set as appropriate by taking into consideration a width of the dead zone 77 that is preferable as an adjustment margin.

The above-mentioned base boundary speed threshold value SVth_Bbd and the adjustment boundary speed threshold value SVth_Abd are such that the latter (SVth_Abd) takes a value smaller than the former (SVth_Bbd) by a speed difference $\Delta$SVth, as FIG. 4C illustrates a comparison between them. An adjustment in which the width of the dead zone 77 is made narrower by this speed difference $\Delta$SVth is performed.

In the electric suspension device 11 according to the embodiment of the present invention, when the behavior of the vehicle satisfies a predetermined vibration suppression condition (specifically described later), an adjustment is performed in which the width of the dead zone 77 is made narrower than the width of the dead zone 77 in the state where this vibration suppression condition is not satisfied. This adjustment to narrow the width of the dead zone 77 is executed by selectively using the adjustment sprung speed conversion characteristic in the adjustment sprung speed conversion map 75, instead of the base sprung speed conversion characteristic in the base sprung speed conversion map 73.

In the first speed range SV1 illustrated in FIG. 4C, the adjustment sprung speed conversion map 75 has such a characteristic that the output-side sprung speed SVout takes a fixed value (zero) regardless of the change in the input-side sprung speed SVin. That is, when the input-side sprung speed SVin is in the first speed range SV1(−SVth_Abd<SV<SVth_Abd), the corresponding output-side sprung speed SVout is zero.

The second and third speed ranges SV2 and SV3 illustrated in FIG. 4C are speed ranges in which the input-side sprung speed SVin is greater than the adjustment boundary speed threshold value SVth_Abd($|SV-SVth\_Abd|>0$).

In the second speed range SV2, the adjustment sprung speed conversion map 75 has such a characteristic that the output-side sprung speed SVout takes values greater than the input-side sprung speed SVin (SVin<SVout) except for the transition period in which the input-side sprung speed SVin exceeds the adjustment boundary speed threshold value SVth_Abd and reaches the output-side sprung speed SVout.

On the other hand, in the third speed range SV3, the adjustment sprung speed conversion map 75 has such a characteristic that the input-side sprung speed SVin takes values greater than or equal to the output-side sprung speed SVout (SVin$\ge$SVout).

Note that an appropriate value may be set as the adjustment boundary speed threshold value SVth_Abd by referring to an evaluation result acquired by evaluating a probability density function of the sprung speed SV through tests, simulations, etc. and ensuring, for example, that the distribution ratio of sprung speeds SV appearing in the first speed speed SV1, the second speed range SV2, and the third speed range SV3 satisfies a predetermined distribution ratio.

The bounce target load calculation unit 53 calculates a value of a bounce target load BTL suitable for the sprung speed SV. When calculating the bounce target load BTL, the bounce target load calculation unit 53 refers to the information on the output-side sprung speed SVout after the conversion by the sprung speed conversion unit 71, the information on the sprung acceleration SA, and the bounce target load map (see FIG. 4D) 52. The bounce target load map 52 is a table conceptually indicating a relation between the sprung speed SV and the bounce target load BTL varying according to the sprung speed SV (bounce target load characteristic).

The value of the bounce target load BTL calculated by the bounce target load calculation unit 53 is sent to the primary multiplication unit 55.

Incidentally, as for the content stored in the bounce target load map 52, target values of a damping force control current may be used in place of the values of the bounce target load BTL.

Now, the bounce target load characteristic in the bounce target load map 52 will be described with reference to FIG. 4D.

The range of change in the sprung speed SV in the bounce target load map 52 includes a 11th speed range SV11 and a 12th speed range SV12, as indicated by the divided horizontal axis in FIG. 4D.

The 11th speed range SV11 is a speed range on the extension side in which the sprung speed SV illustrated along the horizontal axis of FIG. 4D is above zero.

As illustrated in FIG. 4D, the bounce target load characteristic in the 11th speed range SV11 in the bounce target load map 52 is such that the higher the sprung speed SV becomes toward the extension side, the larger the bounce target load BTL orientated toward the contraction side becomes in a manner of an infinite geometric series.

The 12th speed range SV12, on the other hand, is a speed range on the contraction side in which the sprung speed SV illustrated along the horizontal axis of FIG. 4D is below zero.

As illustrated in FIG. 4D, the bounce target load characteristic in the 12th speed range SV12 in the bounce target load map 52 is such that the higher the sprung speed SV becomes toward the contraction side, the larger the bounce target load BTL orientated toward the extension side becomes in a manner of an infinite geometric series.

Now, what should be noted here is that the bounce target load calculation unit 53 refers to the information on the output-side sprung speed SVout after the conversion by the sprung speed conversion unit 71 and the bounce target load map 52 when calculating the bounce target load BTL.

For example, in the case where the base sprung speed conversion map 73 illustrated in FIG. 4B is selected as the sprung speed conversion map, the bounce target load calculation unit 53 combines the base sprung speed conversion characteristic in the base sprung speed conversion map 73 and the bounce target load characteristic in the bounce target load map 52 illustrated in FIG. 4D to thereby calculate values of the bounce target load BTL having a bounce target load characteristic as illustrated in FIG. 4E.

In the bounce target load characteristic in the bounce target load map 52 illustrated in FIG. 4E, looking at the ranges of change in the sprung speed SV in the bounce target load map 52, a 13th speed range SV13 as the dead zone 77 is present between the 11th speed range SV11 and the 12th speed range SV12, unlike the bounce target load characteristic in the bounce target load map 52 illustrated in FIG. 4D.

The 13th speed range SV13 is a speed range in which the sprung speed SV illustrated along the horizontal axis of FIG. 4E is a first speed threshold value SVth1 or less (|SV−SVth1|≤0). The first speed threshold value SVth1 is a speed threshold value corresponding to the base boundary speed threshold value SVth_Bbd illustrated in FIG. 4B.

In the 13th speed range SV13 illustrated in FIG. 4E, the bounce target load map 52 has such a characteristic that the bounce target load BTL takes a fixed value (zero) regardless of the change in the sprung speed SV. That is, when the sprung speed SV is in the 13th speed range SV13(−SVth1<SV<SVth1; the dead zone 77), the corresponding bounce target load BTL is zero.

On the other hand, for example, in the case where the adjustment sprung speed conversion map 75 illustrated in FIG. 4C is selected as the sprung speed conversion map, the bounce target load calculation unit 53 combines the adjustment sprung speed conversion characteristic in the adjustment sprung speed conversion map 75 and the bounce target load characteristic in the bounce target load map 52 illustrated in FIG. 4D to thereby calculate values of the bounce target load BTL having a bounce target load characteristic as illustrated in FIG. 4F.

In the bounce target load characteristic in the bounce target load map 52 illustrated in FIG. 4F, a 14th speed range SV14 as the dead zone 77 is present between the 11th speed range SV11 and the 12th speed range SV12, like the bounce target load characteristic in the bounce target load map 52 illustrated in FIG. 4E.

The 14th speed range SV14 is a speed range in which the sprung speed SV illustrated along the horizontal axis of FIG. 4F is a second speed threshold value SVth2 or less (|SV−SVth2|≤0). The second speed threshold value SVth2 is set at a value smaller than the first speed threshold value SVth1. In other words, the width of the dead zone 77 in the bounce target load map 52 illustrated in FIG. 4F is narrower than the width of the dead zone 77 in the bounce target load map 52 illustrated in FIG. 4E. The second speed threshold value SVth2 is a speed threshold value corresponding to the adjustment boundary speed threshold value SVth_Abd illustrated in FIG. 4C.

In the 14th speed range SV14 illustrated in FIG. 4F, the bounce target load map 52 has such a characteristic that the bounce target load BTL takes a fixed value (zero) regardless of the change in the sprung speed SV, as in the example of the 13th speed range SV13 illustrated in FIG. 4E. That is, when the sprung speed SV is in the 14th speed range SV14(−SVth2<SV<SVth2; the dead zone 77), the corresponding bounce target load BTL is zero.

The primary multiplication unit 55 multiplies the B gain set in the B gain setting unit 51 and the value of the bounce target load BTL calculated by the bounce target load calculation unit 53 by each other. The result of the multiplication by the primary multiplication unit 55 is sent to the secondary multiplication unit 67.

A predetermined extension-side gain (Ten gain) for the sprung speed SV is set in the Ten gain setting unit 61. The Ten gain set in the Ten gain setting unit 61 is sent to the selection unit 65.

A predetermined contraction-side gain (Comp gain) for the sprung speed SV is set in the Comp gain setting unit 63. The Comp gain set in the Comp gain setting unit 63 is sent to the selection unit 65.

The selection unit 65 selects one of the pieces of information on the Ten gain set in the Ten gain setting unit 61, the Comp gain set in the Comp gain setting unit 63, and the sprung speed SV by following a predetermined procedure. The piece of information selected by the selection unit 65 is sent to the secondary multiplication unit 67.

The secondary multiplication unit 67 multiplies the result of the multiplication by the primary multiplication unit 55 and the piece of information selected by the selection unit 65 by each other. The result of the multiplication by the secondary multiplication unit 67 is sent to the addition unit 69 (specifically described later).

The pitch target value computation unit 48 computes the pitch target value for controlling the pitch orientation of the vehicle 10 based on the sprung pitch rate PV, as mentioned earlier.

The roll target value computation unit 49 computes the roll target value for controlling the roll orientation of the vehicle 10 based on the sprung roll rate RV, as mentioned earlier.

The addition unit 69 adds up the result of the multiplication by the secondary multiplication unit 67 belonging to the bounce target value computation unit 47 (bounce target value), the result of the computation by the pitch target value computation unit 48 (pitch target value), and the result of the computation by the roll target value computation unit 49 (roll target value).

The addition unit 69 forms apart of the "driving control unit 45" in the present invention.

A combined target load obtained by combining all control target values for the bounce orientation, the pitch orientation, and the roll orientation, which is the result of the addition by the addition unit 69, is sent to the electromagnetic actuator 13 provided for each of the FL (front left), FR (front right), RL (rear left), and RR (rear right) wheels.

[Operation of Electric suspension device 11]

Figure 5:
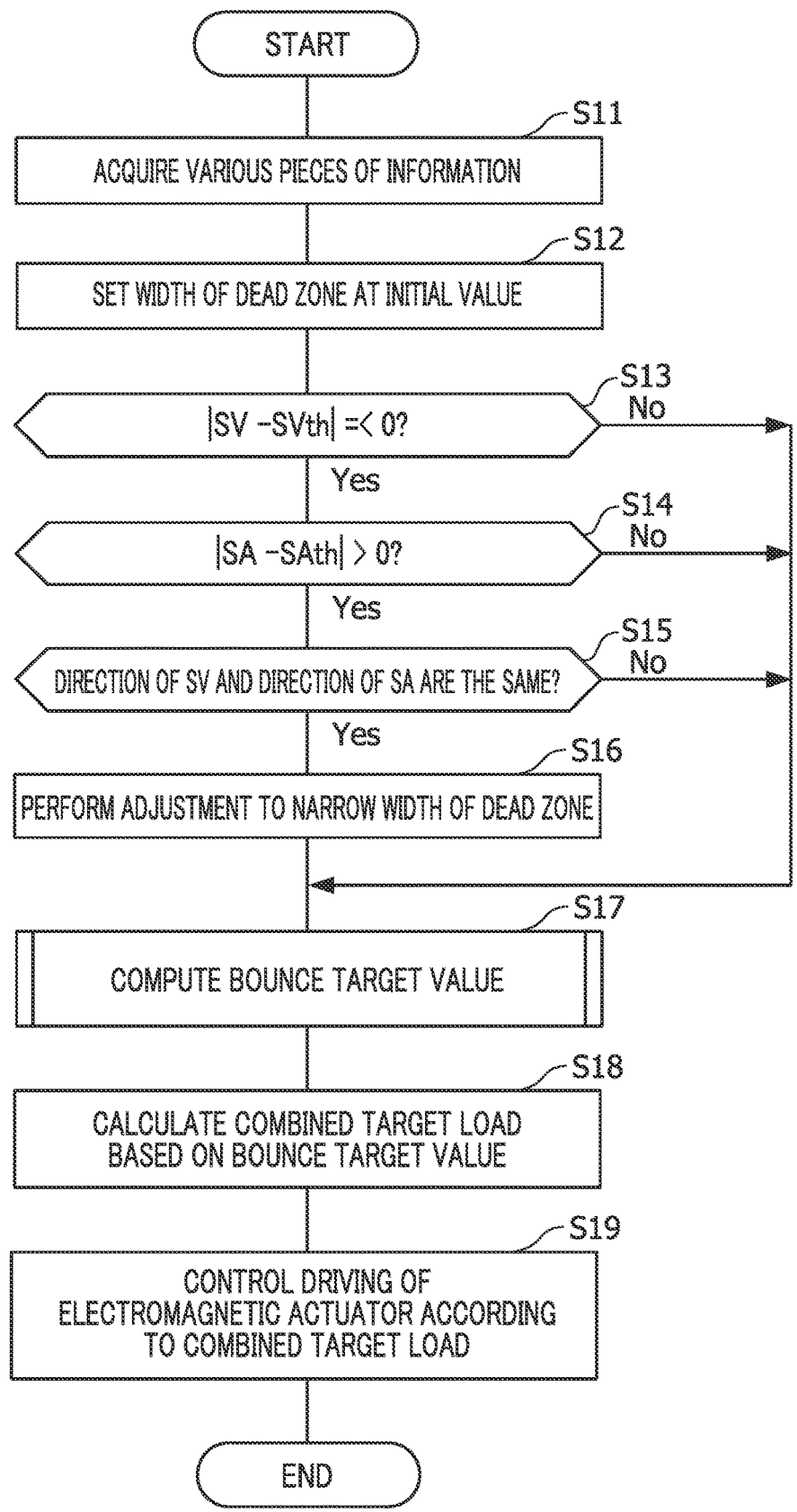
FIG. 5 is a flowchart to be used to describe operation of the electric suspension device according to an embodiment of the present invention.

Next, operation of the electric suspension device 11 according to an embodiment of the present invention will be described with reference to FIG. 5. FIG. 5 is a flowchart to be used to describe the operation of the electric suspension device 11 according to the embodiment of the present invention.

In step S11 illustrated in FIG. 5, the information acquisition unit 41 of the load control ECU 15 acquires the rotational angle signal from each electric motor 31 detected by the resolver 37 as time-series information on the stroke position and acquires information on the sprung speed SV by time-differentiating the time-series information on the stroke position.

Further, the information acquisition unit 41 acquires information on the sprung pitch rate PV, the sprung roll rate RV, and the sprung acceleration SA.

Furthermore, the information acquisition unit 41 acquires information on the vehicle speed VS, the stroke position of the electromagnetic actuator 13, and the motor current for the electric motor 31.

The pieces of information on the sprung speed SV, the sprung pitch rate PV, the sprung roll rate RV, the sprung acceleration SA, the vehicle speed VS, the stroke position of the electromagnetic actuator 13, and the motor current for the electric motor 31 acquired by the information acquisition unit 41 are sent to the target load computation unit 43.

In step S12, the bounce target load calculation unit 53 belonging to the target load computation unit 43 of the load control ECU 15 sets the width of the dead zone 77 in the bounce target load characteristic in the bounce target load map 52 at an initial value (see the width of the dead zone 77 in the 13th speed range SV13 illustrated in FIG. 4E).

In order to set the width of the dead zone 77 at this initial value, the sprung speed conversion unit 71 converts the input-side sprung speed SVin into an output-side sprung speed SVout by using the base sprung speed conversion map 73 and outputs the output-side sprung speed SVout. The bounce target load calculation unit 53 in turn operates so as to set the width of the dead zone 77 in the bounce target load characteristic in the bounce target load map 52 at the initial value (see the width of the dead zone 77 in the 13th speed range SV13 illustrated in FIG. 4E).

In step S13, the bounce target load calculation unit 53 belonging to the target load computation unit 43 of the load control ECU 15 determines whether or not the sprung speed SV acquired by the information acquisition unit 41 is a predetermined speed threshold value SVth or less (|SV−SVth|≤0). A guideline for setting the predetermined speed threshold value SVth will be described later.

If the result of the determination made in step S13 indicates that the sprung speed SV is greater than the predetermined speed threshold value SVth (|SV−SVth|>0), the load control ECU 15 causes the process flow to jump to step S17.

If, on the other hand, the result of the determination made in step S13 indicates that the sprung speed SV is the predetermined speed threshold value SVth or less (|SV−SVth|≤0), the load control ECU 15 causes the process flow to advance to the next step S14.

In step S14, the bounce target load calculation unit 53 belonging to the target load computation unit 43 of the load control ECU 15 determines whether the sprung acceleration SA acquired by the information acquisition unit 41 is greater than a predetermined acceleration threshold value SAth (|SA−SAth−>0). A guideline for setting the predetermined acceleration threshold value SAth will be described later.

If the result of the determination made in step S14 indicates that the sprung acceleration SA is the predetermined acceleration threshold value SAth or less (|SA−SAth|≤0), the load control ECU 15 causes the process flow to jump to step S17.

If, on the other hand, the result of the determination made in step S14 indicates that the sprung acceleration SA is greater than the predetermined acceleration threshold value SAth (|SA−SAth|>0), the load control ECU 15 causes the process flow to advance to the next step S15.

Here, in the electric suspension device 11 according to the embodiment of the present invention, when the sprung speed SV is the predetermined speed threshold value SVth or less (Yes in step S13) and the sprung acceleration SA is greater than the predetermined acceleration threshold value SAth (Yes in step S14), it is assumed that a first vibration suppression condition is satisfied, that is, the probability of continuation of the vehicle body vibration is high. The target load computation unit 43 of the load control ECU 15 then performs an adjustment in which the width of the dead zone 77 in the bounce target load characteristic in the bounce target load map 52 is made narrower than the width (initial value) of the dead zone 77 in the state where the first vibration suppression condition is not satisfied.

This is done in an attempt to appropriately suppress changes in behavior of the vehicle 10 even when the dead zone 77 is set in a speed range including the switch point for the sprung speed SV.

The predetermined speed threshold value SVth and the predetermined acceleration threshold value SAth may be set at appropriate values based on whether the probability of continuation of vehicle body vibration can be assumed to be high when the sprung speed SV is the predetermined speed threshold value SVth or less and the sprung acceleration SA is greater than the predetermined acceleration threshold value SAth (the first vibration suppression condition is satisfied).

In step S15, the target load computation unit 43 of the load control ECU 15 determines whether the direction of the sprung speed SV and the direction of the sprung acceleration SA are the same based on the information indicating toward which one of the extension side and the contraction side the direction of the sprung speed SV is oriented and the information indicating toward which one of the extension side and the contraction side the direction of the sprung acceleration SA is oriented, which have been acquired by the information acquisition unit 41.

Here, the target load computation unit 43 of the load control ECU 15 determines that the direction of the sprung speed SV and the direction of the sprung acceleration SA are the same if the direction of the sprung speed SV and the direction of the sprung acceleration SA are both oriented toward the extension side or toward the contraction side.

If the result of the determination made in step S15 indicates that the direction of the sprung speed SV and the direction of the sprung acceleration SA are not the same, the load control ECU 15 causes the process flow to jump to step S17.

If, on the other hand, the result of the determination made in step S15 indicates that the direction of the sprung speed SV and the direction of the sprung acceleration SA are the same (a second vibration suppression condition is satisfied), the load control ECU 15 assumes that the probability of increase of the vehicle body vibration is high, and causes the process flow to advance to the next step S16.

In step S16, the target load computation unit 43 of the load control ECU 15 performs an adjustment in which the width of the dead zone 77 in the bounce target load characteristic in the bounce target load map 52 is made narrower than the width (initial value) of the dead zone 77 in the state where the first vibration suppression condition or the second vibration suppression condition is not satisfied.

This appropriately suppresses changes in behavior of the vehicle 10 even when the dead zone 77 is set in a speed range including the switch point for the sprung speed SV.

In step S17, if at least one of the first and second vibration suppression conditions in steps S13 to S15 has not been satisfied and therefore the adjustment to narrow the width of the dead zone 77 in step S16 has not been performed, the bounce target value computation unit 47 belonging to the target load computation unit 43 of the load control ECU 15 computes the bounce target load (bounce target value) BTL by referring to the bounce target load characteristic in the bounce target load map 52 having the width of the dead zone 77 set at the initial value in step S12.

On the other hand, in step S17, if the first and second vibration suppression conditions in steps S13 to S15 have been satisfied and therefore the adjustment to narrow the width of the dead zone 77 in step S16 has been performed, the bounce target value computation unit 47 belonging to the target load computation unit 43 of the load control ECU 15 computes the bounce target load (bounce target value) BTL by referring to the bounce target load characteristic in the bounce target load map 52 having the (narrowed) width of the dead zone 77 after the adjustment in step S16.

In step S18, the addition unit 69 belonging to the driving control unit 45 of the load control ECU 15 adds up the result of the multiplication by the secondary multiplication unit 67 belonging to the bounce target value computation unit 47 (bounce target value), the result of the computation by the pitch target value computation unit 48 (pitch target value), and the result of the computation by the roll target value computation unit 49 (roll target value). As a result, a combined target load is calculated, which is obtained by combining all control target values for the bounce orientation, the pitch orientation, and the roll orientation.

In step S19, the driving control unit 45 of the load control ECU 15 controls the driving of each electromagnetic actuator 13 according to the combined target load calculated in step S18.

In the electric suspension device 11 according to the embodiment of the present invention, when the predetermined first vibration suppression condition is satisfied (the sprung speed SV is the predetermined speed threshold value SVth or less and the sprung acceleration SA is greater than the predetermined acceleration threshold value SAth) and the predetermined second vibration suppression condition is satisfied (the direction of the sprung speed SV and the direction of the sprung acceleration SA are the same), it is assumed that the probability of continuation of the vehicle body vibration is high and the probability of increase of the vehicle body vibration is high. The target load computation unit 43 of the load control ECU 15 then performs the adjustment in which the width of the dead zone 77 in the bounce target load characteristic in the bounce target load map 52 is made narrower than the width (initial value) of the dead zone 77 in the state where at least one of the first and second vibration suppression conditions is not satisfied.

According to the electric suspension device 11 according to the embodiment of the present invention, when the predetermined first and second vibration suppression conditions are satisfied, it is assumed that the probability of continuation of the vehicle body vibration is high and the probability of increase of the vehicle body vibration is high, and the adjustment to narrow the width of the dead zone 77 in the bounce target load characteristic in the bounce target load map 52 is performed. In this way, it is possible to appropriately suppress changes in behavior of the vehicle 10 even when the dead zone 77 is set in a speed range including the switch point for the sprung speed SV.

It is also possible to appropriately suppress changes in behavior of the vehicle 10 by controlling the driving of the electromagnetic actuator 13 with all control target values for the bounce orientation, the pitch orientation, and the roll orientation taken into consideration.

[Operation and Advantageous Effects of Electric suspension devices 11 According to Embodiments of The Present Invention]

An electric suspension device 11 based on a first aspect is, as a premise, an electric suspension device 11 including an actuator (electromagnetic actuator 13) that is provided between a body and a wheel of a vehicle 10 and generates damping force for damping vibration of the body.

The electric suspension device 11 based on the first aspect includes: an information acquisition unit 41 that acquires information on each of a sprung speed SV and a sprung acceleration SA of the vehicle 10; a bounce target value computation unit 47 that computes a bounce target value for controlling a bounce orientation of the vehicle 10 based on the sprung speed SV; a driving control unit 45 that controls driving of the electromagnetic actuator 13 by using a control target load which is based on the bounce target value.

The bounce target value computation unit 47 has a function (bounce target load map 52) in which the bounce target value is associated with the sprung speed SV. In the bounce target load map 52, a dead zone 77 is set in which a fixed value is associated as the bounce target value with changes in the sprung speed SV belonging to a predetermined speed range including a direction switch point at which a direction of the sprung speed SV switches from an extension side to a contraction side or from the extension side to the contraction side. The bounce target value computation unit 47 adjusts a width of the dead zone 77 based on the information on the sprung speed SV and the sprung acceleration SA.

In the electric suspension device 11 based on the first aspect, the information acquisition unit 41 acquires the information on each of the sprung speed SV and the sprung acceleration SA of the vehicle 10. The bounce target value computation unit 47 computes the bounce target value for controlling the bounce orientation of the vehicle 10 based on the sprung speed SV. The driving control unit 45 controls the driving of the electromagnetic actuator 13 by using the control target load that is based on the bounce target value.

The width of the dead zone 77 is strongly correlated to the accuracy of the control of changes in behavior of the vehicle 10. Also, the information on the sprung speed SV and the sprung acceleration SA is strongly correlated to the vibration suppression and convergence performance for vehicle body vibration.

The bounce target value computation unit 47 is therefore configured to adjust the width of the dead zone 77 based on the information on the sprung speed SV and the sprung acceleration SA.

According to the electric suspension device 11 based on the first aspect, the bounce target value computation unit 47 adjusts the width of the dead zone 77 based on the information on the sprung speed SV and the sprung acceleration SA. In this way, even when the dead zone 77 is set in a speed range including the switch point for the sprung speed SV, it is possible to enhance the vibration suppression and convergence performance for vehicle body vibration and thus appropriately suppress changes in behavior of the vehicle 10.

Also, an electric suspension device 11 based on a second aspect is the electric suspension device 11 based on the first aspect, in which When a first vibration suppression condition that the sprung speed SV is a predetermined speed threshold value SVth or less and the sprung acceleration SA is greater than a predetermined acceleration threshold value SAth is satisfied, the bounce target value computation unit 47 performs an adjustment in which the width of the dead zone 77 is made narrower than the width of the dead zone 77 in a state where the first vibration suppression condition is not satisfied, and performs computation of the bounce target value by using the bounce target load map 52 in which the dead zone 77 after the adjustment is set.

The driving control unit 45 may be configured to control the driving of the electromagnetic actuator 13 by using a control target load which is based on the bounce target value obtained by the computation.

In the electric suspension device 11 based on the second aspect, when the first vibration suppression condition that the sprung speed SV is the predetermined speed threshold value SVth or less and the sprung acceleration SA is greater than the predetermined acceleration threshold value SAth is satisfied, the bounce target value computation unit 47 performs the adjustment in which the width of the dead zone 77 is made narrower than the width of the dead zone 77 in the state where the first vibration suppression condition is not satisfied. The bounce target value computation unit 47 performs the computation of the bounce target value by using the bounce target load map 52 in which the dead zone 77 after the adjustment is set.

Here, according to studies by the present inventors, it has been found that the probability of continuation of vehicle body vibration is high when the first vibration suppression condition that the sprung speed SV is the predetermined speed threshold value SVth or less and the sprung acceleration SA is greater than the predetermined acceleration threshold value SAth is satisfied.

Also, when the adjustment to narrow the width of the dead zone 77 is performed, the range in the bounce target load map 52 across which the bounce target value changes with change in the sprung acceleration SA becomes wider by the amount by which the width of the dead zone 77 is narrowed. Accordingly, changes in the sprung acceleration SA can be finely reflected on the bounce target value.

The driving control unit 45 then controls the driving of the electromagnetic actuator 13 by using a control target load which is based on the bounce target value obtained by the computation.

According to the electric suspension device 11 based on the second aspect, when the first vibration suppression condition is satisfied, that is, when the probability of continuation of the vehicle body vibration is high, the bounce target value computation unit 47 performs the adjustment in which the width of the dead zone 77 is made narrower than the width of the dead zone 77 in the state where the vibration suppression condition is not satisfied. In this way, even when the dead zone 77 is set in a speed range including the switch point for the sprung speed SV, it is possible to enhance the vibration suppression and convergence performance for vehicle body vibration to a greater extent and thus suppress changes in behavior of the vehicle 10 more appropriately than the advantageous effect achieved by the electric suspension device 11 based on the first aspect.

Also, an electric suspension device 11 based on a third aspect is the electric suspension device 11 based on the first or second aspect, in which the information acquisition unit 41 further acquires information on each of the direction of the sprung speed SV of the vehicle 10 and a direction of the sprung acceleration SA of the vehicle 10.

When a second vibration suppression condition that the direction of the sprung speed SV and the direction of the sprung acceleration SA are same is satisfied, the bounce target value computation unit 47 performs an adjustment in which the width of the dead zone 77 is made narrower than the width of the dead zone 77 in a state where the second vibration suppression condition is not satisfied. The bounce target value computation unit 47 performs computation of the bounce target value by using the bounce target load map 52 in which the dead zone 77 after the adjustment is set.

Here, according to studies by the present inventors, it has been found that the probability of increase of vehicle body vibration is high when the second vibration suppression condition that the direction of the sprung speed SV and the direction of the sprung acceleration SA are the same is satisfied. On the other hand, according to studies by the present inventors, it has been found that the probability of convergence of vehicle body vibration is high when the direction of the sprung speed SV and the direction of the sprung acceleration SA are different.

Also, when the adjustment to narrow the width of the dead zone 77 is performed, the range in the bounce target load map 52 across which the bounce target value changes with change in the sprung acceleration SA becomes wider by the amount by which the width of the dead zone 77 is narrowed. Accordingly, changes in the sprung acceleration SA can be finely reflected on the bounce target value.

The driving control unit 45 then controls the driving of the electromagnetic actuator 13 by using a control target load which is based on the bounce target value obtained by the computation.

According to the electric suspension device 11 based on the third aspect, when the second vibration suppression condition is satisfied, that is, when the probability of increase of the vehicle body vibration is high, the bounce target value computation unit 47 performs the adjustment in which the width of the dead zone 77 is made narrower than the width of the dead zone 77 in the state where the second vibration suppression condition is not satisfied. In this way, even when the dead zone 77 is set in a speed range including the switch point for the sprung speed SV, it is possible to enhance the vibration suppression and convergence performance for vehicle body vibration to a greater extent and thus suppress changes in behavior of the vehicle 10 more appropriately than the advantageous effect achieved by the electric suspension device 11 based on the first aspect.

Further, when the first and second vibration suppression conditions are satisfied, that is, when the probability of continuation of the vehicle body vibration is high and the probability of increase of the vehicle body vibration is high, the bounce target value computation unit 47 performs an adjustment in which the width of the dead zone 77 is made narrower than the width of the dead zone 77 in a state where at least one of the first and second vibration suppression conditions is not satisfied. In this way, even when the dead zone 77 is set in a speed range including the switch point for the sprung speed SV, it is possible to enhance the vibration suppression and convergence performance for vehicle body vibration to an even greater extent and thus suppress changes in behavior of the vehicle 10 even more appropriately than the advantageous effect achieved by the electric suspension device 11 based on the first or second aspect.

Other Embodiments

The plurality of embodiments described above represent examples of embodying the present invention. Therefore, the technical scope of the present invention shall not be interpreted in a limited manner by these embodiments. This is because the present invention can be implemented in various ways without departing from its gist or its main characteristic features.

For example, in the description of the electric suspension device 11 according to the present invention, the electromagnetic actuator 13 to which the rotational driving force of the electric motor 31 converted in the vertical stroke direction is applied has been described as an example of the member corresponding to the actuator according to the present invention. However, the present invention is not limited to this example.

A publicly known mono-tube (de Carbon) adjustable damper as disclosed in, for example, Japanese Patent Application Publication 2015-47906 may be employed as the member corresponding to the actuator according to the present invention. This adjustable damper includes a circular cylinder filled with a magnetorheological fluid (MRF) and a piston rod inserted therein so as to be axially slidable. A piston mounted to the distal end of the piston rod partitions the inside of the cylinder into an upper oil chamber and a lower oil chamber. This piston is provided with a communication channel through which the upper oil chamber and the lower oil chamber communicate with each other, and a MLV coil located inside this communication channel.

Also, in the description of the electric suspension device 11 according to an embodiment of the present invention, the bounce target load characteristic in the bounce target load map 52 has been described by taking the example illustrated in FIGS. 4D to 4F. However, the present invention is not limited to this example.

In the present invention, the bounce target load characteristic in the bounce target load map 52 is not particularly limited. A necessary bounce target load characteristic may be employed as appropriate.

Also, the electric suspension device 11 according to an embodiment of the present invention has been described by taking an example in which the combination of the sprung speed conversion unit 71 and the bounce target load calculation unit 53 is used as the configuration for performing the adjustment to narrow the width of the dead zone 77 in the bounce target load characteristic in the bounce target load map 52. However, the present invention is not limited to this example.

In the present invention, a necessary configuration may be employed as appropriate as the configuration for performing the adjustment to narrow the width of the dead zone 77 in the bounce target load characteristic in the bounce target load map 52.

Also, the electric suspension device 11 according to an embodiment of the present invention has been described by taking an example in which the number of adjustment stages for performing the adjustment to narrow the width of the dead zone 77 in the bounce target load characteristic in the bounce target load map 52 is one (see FIGS. 4E and 4F). However, the present invention is not limited to this example.

In the present invention, any number of stages may be employed as appropriate as the number of adjustment stages for performing the adjustment to narrow the width of the dead zone 77 in the bounce target load characteristic in the bounce target load map 52.

Meanwhile, in the electric suspension device 11 according to an embodiment of the present invention, the information on the sprung speed SV of the vehicle 10 and the information on the sprung acceleration SA of the vehicle 10 are used in combination with each other as parameters to be referred to to determine whether to perform the adjustment of the width of the dead zone 77. This makes it possible to accurately predict whether the vehicle body vibration is going to increase or to converge.

Thus, the adjustment to narrow the width of the dead zone 77 (or an adjustment to widen the width of the dead zone 77) can be performed in a timely and appropriate manner based on the result of the prediction of the vehicle body vibration.

Further, by using the phase difference between the sprung speed SV and the sprung acceleration SA, it is possible to predict, for example, that the probability of continuation of the vehicle body vibration is high when the first vibration suppression condition that the sprung speed SV is the predetermined speed threshold value SVth or less and the sprung acceleration SA is greater than the predetermined acceleration threshold value SAth is satisfied.

Also, it is possible to predict, for example, that the probability of convergence of the vehicle body vibration is high when a condition that the sprung speed SV is the predetermined speed threshold value SVth or less and the sprung acceleration SA is the predetermined acceleration threshold value SAth or less is satisfied.

The configuration may be such that when it is predicted that the probability of continuation of the vehicle body vibration is high, the adjustment to widen the width of the dead zone 77 is performed to enhance the vibration convergence and suppression performance for the vehicle body vibration.

Also, the electric suspension device 11 according to the embodiments of the present invention has been described by taking an example in which a total of four electromagnetic actuators 13 are disposed for both the front wheels (front left wheel and front right wheel) and the rear wheels (rear left wheel and rear right wheel). However, the present invention is not limited to this example. A configuration in which a total of two electromagnetic actuators 13 are disposed for either the front wheels or the rear wheels may be employed.

Lastly, in the description of the electric suspension device 11 according to the embodiments of the present invention, the driving control unit 45 has been mentioned which controls the driving of the plurality of electromagnetic actuators 13 independently of each other.

Specifically, the driving control unit 45 may control the driving of the electromagnetic actuators 13 provided for the four wheels independently on a wheel-by-wheel basis.

Alternatively, the driving control unit 45 may control the driving of the electromagnetic actuators 13 provided for the four wheels such that the driving of the electromagnetic actuators 13 on the front wheels is controlled independently of that of the electromagnetic actuators 13 on the rear wheels or the driving of the electromagnetic actuators 13 on the left wheels is controlled independently of that of the electromagnetic actuators 13 on the right wheels.

What is claimed is:

1. An electric suspension including an actuator that is provided between a body and a wheel of a vehicle and generates damping force for damping vibration of the body, the electric suspension device comprising a load control electronic control unit (ECU) configured to:
   acquire information on each of a sprung speed and a sprung acceleration of the vehicle;
   compute a bounce target value for controlling a bounce orientation of the vehicle based on the sprung speed; and
   control driving of the actuator by using a control target load which is based on the bounce target value,
   wherein
   the load control ECU is configured to have a function in which the bounce target value is associated with the sprung speed,
   in the function, a dead zone is set in which a fixed value is associated as the bounce target value with changes in the sprung speed belonging to a predetermined speed range including a direction switch point at which a direction of the sprung speed switches from an extension side to a contraction side or from the contraction side to the extension side,
   the load control ECU is configured to adjust a width of the dead zone based on both of the information on the sprung speed and the sprung acceleration,
   when a first vibration suppression condition that the sprung speed is a predetermined speed threshold value or less and the sprung acceleration is greater than a predetermined acceleration threshold value is satisfied, the load control ECU is configured to perform an adjustment in which the width of the dead zone is made narrower than the width of the dead zone in a state where the first vibration suppression condition is not satisfied, and to perform computation of the bounce target value by using the function in which the dead zone after the adjustment is set, and the load control ECU is configured to control the driving of the actuator by using a control target load which is based on the bounce target value obtained by the computation.

2. An electric suspension device including an actuator that is provided between a body and a wheel of a vehicle and generates damping force for damping vibration of the body, the electric suspension device comprising a load control electronic control unit (ECU) configured to:

acquire information on each of a sprung speed and a sprung acceleration of the vehicle;

compute a bounce target value for controlling a bounce orientation of the vehicle based on the sprung speed; and control driving of the actuator by using a control target load which is based on the bounce target value, wherein the load control ECU is configured to have a function in which the bounce target value is associated with the sprung speed, in the function, a dead zone is set in which a fixed value is associated as the bounce target value with changes in the sprung speed belonging to a predetermined speed range including a direction switch point at which a direction of the sprung speed switches from an extension side to a contraction side or from the contraction side to the extension side, the load control ECU is configured to adjust a width of the dead zone based on both of the information on the sprung speed and the sprung acceleration, the load control ECU is further configured to acquire information on each of the direction of the sprung speed of the vehicle and a direction of the sprung acceleration of the vehicle, when a second vibration suppression condition that the direction of the sprung speed and the direction of the sprung acceleration are same is satisfied, the load control ECU is configured to perform an adjustment in which the width of the dead zone is made narrower than the width of the dead zone in a state where the second vibration suppression condition is not satisfied, and to perform computation of the bounce target value by using the function in which the dead zone after the adjustment is set, and the load control ECU is configured to control the driving of the actuator by using a control target load which is based on the bounce target value obtained by the computation.

* * * * *